(12) United States Patent
DeBraal et al.

(10) Patent No.: US 7,811,644 B2
(45) Date of Patent: Oct. 12, 2010

(54) INSULATED BEVERAGE OR FOOD CONTAINER

(75) Inventors: John Charles DeBraal, Appleton, WI (US); John MacKay Lazar, Custer, WI (US)

(73) Assignee: Appleton Papers Inc., Appleton, WI (US)

( * ) Notice: Subject to any disclaimer, the term of this patent is extended or adjusted under 35 U.S.C. 154(b) by 391 days.

(21) Appl. No.: 10/115,947

(22) Filed: Apr. 5, 2002

(65) Prior Publication Data

US 2002/0144769 A1  Oct. 10, 2002

Related U.S. Application Data

(60) Provisional application No. 60/281,368, filed on Apr. 5, 2001, provisional application No. 60/298,386, filed on Jun. 18, 2001.

(51) Int. Cl.
*B32B 27/00* (2006.01)
*B32B 29/00* (2006.01)
*B32B 1/02* (2006.01)
*B32B 1/08* (2006.01)

(52) U.S. Cl. .................. 428/34.2; 428/34.1; 428/35.7; 428/35.9; 428/36.9; 428/36.91; 428/36.7

(58) Field of Classification Search ............... 428/34.1, 428/34.2, 36.91, 35.7, 35.9, 36.9, 36.7
See application file for complete search history.

(56) References Cited

U.S. PATENT DOCUMENTS

| 2,038,071 | A | * | 4/1936 | Wilhelm ..................... 96/118 |
| 4,261,501 | A | * | 4/1981 | Watkins et al. ............... 229/404 |
| 4,349,124 | A | * | 9/1982 | Faller ..................... 229/122.32 |
| 4,435,344 | A | | 3/1984 | Iioka ......................... 264/45.1 |
| 4,481,262 | A | * | 11/1984 | Shida et al. ................. 428/441 |
| 4,515,840 | A | * | 5/1985 | Gatward ..................... 428/34.3 |
| 5,205,473 | A | * | 4/1993 | Coffin, Sr. .................. 229/403 |
| 5,425,497 | A | | 6/1995 | Sorensen |
| 5,667,135 | A | * | 9/1997 | Schaefer ..................... 229/403 |
| 5,713,512 | A | * | 2/1998 | Barrett ..................... 229/403 |
| 5,840,139 | A | | 11/1998 | Geddes et al. ................. 156/79 |
| 5,911,904 | A | | 6/1999 | Shih et al. ..................... 252/62 |
| 5,952,068 | A | * | 9/1999 | Neale et al. ................. 428/36.5 |
| 5,993,705 | A | | 11/1999 | Grishchenko et al. ...... 264/46.4 |
| 6,030,476 | A | | 2/2000 | Geddes et al. ................. 156/79 |
| 6,070,755 | A | | 6/2000 | Evans et al. ................. 220/783 |
| 6,085,970 | A | * | 7/2000 | Sadlier ....................... 229/403 |
| 6,224,954 | B1 | * | 5/2001 | Mitchell et al. ............. 428/34.2 |
| 6,536,657 | B2 | * | 3/2003 | Van Handel ................ 229/403 |

FOREIGN PATENT DOCUMENTS

CA  02291607  * 12/1999
JP  07011200  *  1/1995

* cited by examiner

*Primary Examiner*—Marc A Patterson
(74) *Attorney, Agent, or Firm*—Birch, Stewart, Kolasch & Birch, LLP

(57) ABSTRACT

An insulating beverage cup is produced with an air containing film layer disposed on an inner surface of a food or beverage paper stock. The air containing film layer is extruded or laminated to the paper stock. An additional extruded or laminated layer is applied between the air containing film layer and paper stock layer. The insulating coating layer decreases the energy transfer between the beverage and the user's hands allowing the user to hold onto the cup for an extended period of time without causing user discomfort or pain. The exterior surface of the beverage cup remains highly printable and predisposed to high quality graphics.

17 Claims, 4 Drawing Sheets

INSULATED BEVERAGE OR FOOD CONTAINER

CROSS-REFERENCE TO RELATED APPLICATIONS

The present inventors claim the benefit of U.S. Provisional Application No. 60/281,368, filed on Apr. 5, 2001, "Insulated Beverage or Food Container;" the entire contents of which are hereby incorporated by reference. The present inventors also claim the benefit of U.S. Provisional Application No. 60/298,386, filed on Jun. 18, 2001, "Insulated Beverage or Food Container;" the entire contents of which are hereby incorporated by reference.

BACKGROUND OF THE INVENTION

1. Field of the Invention

The present invention relates to an apparatus and method for insulating beverage containers and container stock material. In particular, the present invention relates to an insulated, paper-based beverage container or stock material having improved insulation properties and a method of producing these insulated containers or stock materials.

2. Description of the Background Art

Current standard paper cup stock permits excessive heat transfer through the wall of an insulated beverage container. Accordingly, a user's hand becomes uncomfortably or sometimes even painfully hot when excessive heat transfer is permitted through the container wall. This may require the user to be inconvenienced by having to release the container due to the excessive heat of the container's contents. An analogous but opposite situation can occur with very cold beverages, where heat transfer from a user's hand is transferred rapidly to the contents of the container.

U.S. Pat. No. 4,435,344 to Ioka describes a method for producing an insulating composite paper container having a body member and a bottom member. The body member is formed of paper coated or laminated with a thermoplastic synthetic resin film. A surface of the body member is then heated to form a foamed polyethylene heat-insulating layer on either or both of inner and outer surfaces of the container's body member. The heat-insulated body member is then attached to the bottom member.

U.S. Pat. Nos. 6,030,476 and 5,840,139 to Geddes et al. describe a method for producing insulating beverage containers or cups, stock material and containers made therefrom. A stock material includes a base layer, an insulating layer formed on a portion of the base layer, and a printed pattern/mineral oil applied to the insulating layer. The insulating layer is formed from a thermoplastic synthetic resin film.

The devices and methods of the background art suffer from the following disadvantages. Other known designs sacrifice the outside printability of the cup to provide insulation or do not provide adequate insulation properties. The related art has not yet achieved insulated paper stock that is capable of effectively impeding heat transfer between the contents of the container and the exterior. In addition, adequate thermal insulation is not achieved from the related art in a manner that is cost effective.

SUMMARY OF THE INVENTION

The present invention overcomes the shortcomings associated with conventional devices and methods, and achieves other advantages not realized by conventional devices and methods.

It is an aspect of the present invention to provide an insulated beverage container that reduces the energy transfer through a container wall, offers increased functionality and usefulness, and lowers production costs.

It is an aspect of the present invention to provide a container or cup having an exterior surface that is predisposed to printing and high quality graphics.

These and other aspects of the present invention are accomplished by an insulated beverage container stock material comprising a paper stock layer; and an air containing layer having a plurality of air pockets disposed therein.

These and other aspects of the present invention are further accomplished by an insulated beverage container comprising a container wall having a side portion; a bottom portion engaging the container wall along a lower side portion; a paper stock layer arranged along an exterior surface of the container wall; and an air containing layer having a plurality of air pockets disposed therein arranged along an interior surface of the container wall.

These and other aspects of the present invention are further accomplished by a method of producing an insulated beverage container, comprising the steps of providing a paper cupstock having a container wall for surrounding a beverage containing space, a bottom portion, and a paper stock layer arranged along an exterior surface of the container wall; and applying an air containing layer having a plurality of air pockets disposed therein along an interior surface of said container wall.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinafter and the accompanying drawings which are given way of illustration only, and thus are not limitative of the present invention, and wherein.

DETAILED DESCRIPTION OF THE PREFERRED EMBODIMENTS

Figure 1:
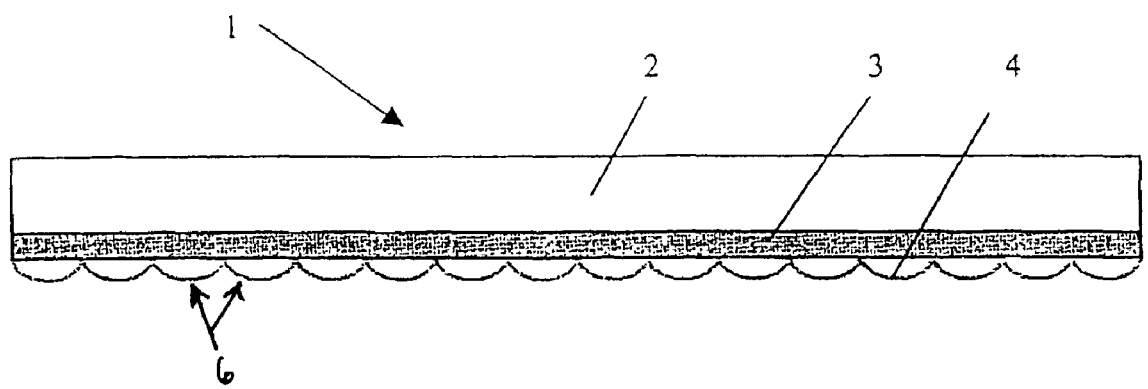
FIG. 1 is a cross-sectional view of an insulated beverage container wall according to a first embodiment of the present invention.

The present invention is directed toward an insulated beverage container or cup, the container stock material, and a method of producing insulated beverages containers or stock materials that utilize an air containment film extruded or laminated to a surface of a food or beverage paper stock. The present invention is described in greater detail hereinafter with reference to the accompanying drawings.

FIGS. 1 through 7 are cross-sectional views of an insulated beverage container wall according to various embodiments of the present invention. One of ordinary skill in the art will appreciate that an insulated container 10 as shown in FIG. 8 will readily incorporate each of the beverage container walls depicted in FIGS. 1 through 7. While the following description is directed toward a cup, the techniques of this invention can be applied to any number of containers or surfaces.

FIG. 8 is a side cross-sectional view of an insulated beverage container 10 according to the present invention. The insulated beverage container includes a container wall 1 having an upper side portion 7, a lower side portion 8 and a bottom portion 9. A beverage containing space 11 is formed between the container wall's 1 upper side portion 7, lower side portion 8 and bottom portion 9.

FIG. 1 is a cross-sectional view of an insulated beverage container wall 1 according to a first embodiment of the present invention. A beverage container wall 1 includes a paper stock 2, an extruded or laminated layer 3 and an air containing film layer 4. The paper stock 2 provides structural rigidity and forms the desired shape of the container 10. The extruded or laminated layer 3 serves to adhere the air containing film layer 4 to the paper stock 2. The air containing film layer 4 is a polymer film spot tacked to an interior surface of the extruded or laminated layer 3 to provide air pockets 6.

As aforementioned, current standard paper cup stock allows excessive heat to transfer through the wall of the container. This results in a user's hand becoming uncomfortably or sometimes even painfully hot or cold when grasping a hot or cold container. The air pockets 6 of the present invention provide insulation of the contents of the container 10, retain the contents (liquid and/or solid mixtures) within the container 10 and aid in sealing any cup seams during the container manufacturing process. The air containing film layer 4 provides resistance to heat transfer through the container wall 1.

The paper stock 2 is standard paper used for making beverage cups and other food containers. The paper stock 2 may be chosen with a thickness that provides optimized physical characteristics for cup construction. Important physical characteristics include fold strength, stiffness, tear and tensile strength.

A desired paper thickness is chosen such that the resultant thickness of the finished cup wall 1 does not negatively impact converting, handling or finished cup properties. A typical paper stock 2 for beverage and food containers range from 10 mils to 26 mils in thickness are indicative of suitable paper stock 2 thickness for the present invention.

The extruded or laminated layer 3 is applied to the paper stock 2 as an extrusion or lamination. The purpose of the extruded or laminated layer 3 is to adhere the air containing film layer 4 to the paper stock 2. However, the extruded or laminated layer 3 can also be used as a barrier to moisture transmission and further aids in seam sealing during container construction.

The extruded or laminated layer 3, although not limited to, can be formed from any of the following exemplary materials: high density polyethylene (HDPE), low density polyethylene (LDPE), linear low density polyethylene (LLDPE), orientated polypropylene (OPP), etc. HDPE and LDPE are desirable materials in a preferred embodiment of the present invention.

Additives known in the paper products industry may also be included to enhance various material properties or to aid in the manufacturing process. These additives include, but are not limited to, any of the following exemplary additives: ethylene vinyl acetate (EVA), ethylene vinyl alcohol (EVOH), and plasticizers.

The air containing film layer 4 is attached to the extruded or laminated layer 3 at specific points and is not in continuous contact therewith. By attaching the air containing film layer 4 to the extruded or laminated layer 3 using a specific pattern, small pockets of air 6 are trapped between the air containing film layer 4 and the extruded or laminated layer 3. The air trapped therein imparts a high level of thermal insulation to the container wall. While a bubble type pattern is indicated in FIG. 1, any design of air pockets is possible. For example, rectangular, diamond-shaped, etc. patterns can be used or a non-uniform placement of the air pockets can be implemented. Further, designs can be incorporated into the placement of the pockets of air 6 such that an embossed or raised appearance can be provided to the cup's 10 surface.

An important aspect of the air containment film layer 4 is to provide resistance to the transfer of energy between the food or beverage and the user's hand. The amount of trapped air is variable and depends upon a specified volume that will render the exterior of the container comfortable to hold for an average user. Therefore, the required amount of trapped air will generally vary according to the intended use of the container.

For instance, a container used to serve coffee (normally 190° F.) will need more resistance to energy flow than a similar container used to serve a relatively cool cup of soup (normally 165° F.). An additional benefit to the insulating layer is the ability of the container to keep the food or beverage at its serving temperature for a longer period of time.

The creation of air pockets 6 under the air containing film layer 4 can be achieved in many ways. During the lamination process, the air containing film layer 4 can be placed against a patterned roll which only allows contact with the extruded or laminated layer 3 at raised surfaces of the patterned roll.

Further, the cells or depressed areas of the pattern roll may be drilled and a vacuum can be applied to draw the film into the depression formed within these areas to create larger pockets of air after sealing to the extruded or laminated layer 3. The pattern roll may also be heated, thereby allowing the air containing film layer 4 to flow into the depressions, creating larger air pockets 6. Further, the paper stock 2 or the air containing film layer 4 may be embossed with depressions before lamination to create larger or additional air pockets 6.

Figure 2:
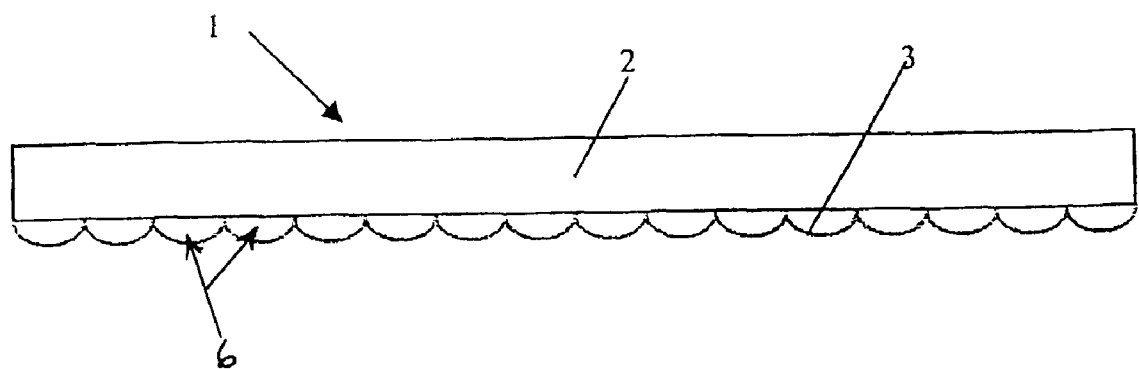
FIG. 2 is a cross-sectional view of an insulated beverage container wall according to a second embodiment of the present invention.

FIG. 2 is a cross sectional view of a container wall according to a second embodiment of the present invention. The intermediate, extruded or laminated layer 4 shown in FIG. 1 has been eliminated in this embodiment. The material for the air containing film layer 3 has been selected with the object of optimizing the properties of air containment, ability to serve as a barrier to various container contents, and seam sealing ability during container construction. The air containing film layer 3 is directly heat bonded to the interior surface of the paper stock 2.

Figure 3:
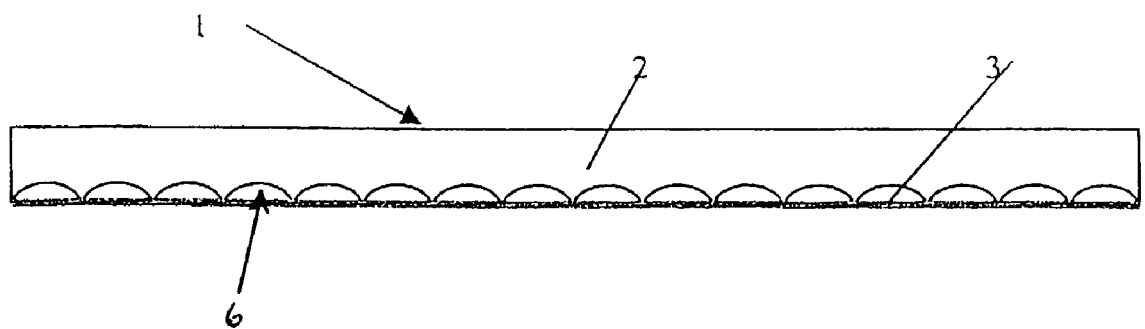
FIG. 3 is a cross-sectional view of an insulated beverage container wall according to a third embodiment of the present invention.

FIG. 3 is a cross sectional view of a container wall according to a third embodiment of the present invention. The paper stock 2 has been embossed to create depressions or pockets in the paper surface to trap air. A layer of laminated or extruded film 3 is applied to the paper stock 2 surface, thereby trapping air in the pockets 6 and creating an air insulating layer therebetween. The layer of laminated or extruded film 3 also serves a barrier to the beverage or food placed within the container, and can also serve as a sealing mechanism. The air pockets 6 may be formed with a blowing agent so as to entrap ambient air and/or inert or innocuous gases therein, e.g., ambient air, helium, nitrogen or carbon dioxide may be entrapped within the air pockets 6. A blowing agent can be used to achieve the pockets 6 that would could be void of air or even contain a blowing agent gas.

Figure 4:
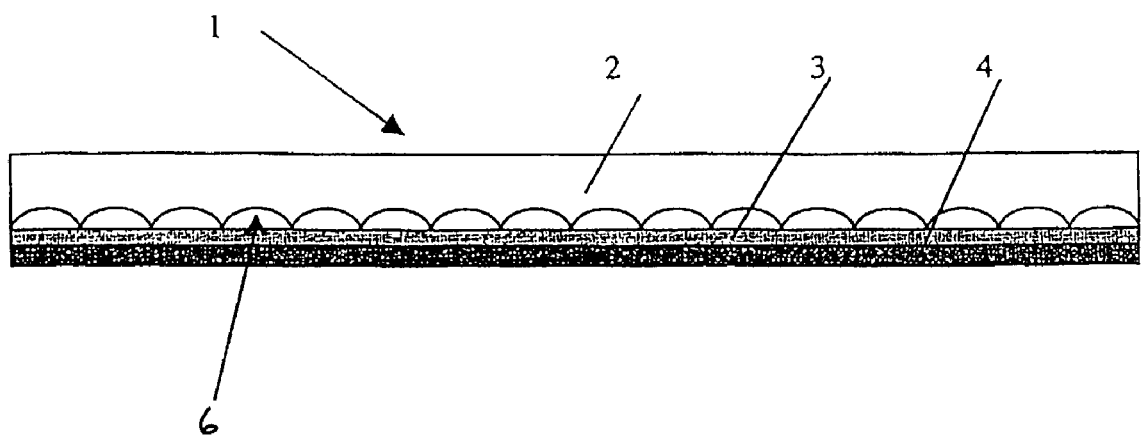
FIG. 4 is a cross-sectional view of an insulated beverage container wall according to a fourth embodiment of the present invention.

FIG. 4 is a cross sectional view of a container wall according to a fourth embodiment of the present invention. A HDPE layer 3 is extruded or laminated between an embossed paper stock surface 2 and the film layer 4. The HDPE layer 3 adheres the film layer 4 to the paper stock 2 surface, aids in the barrier properties of the container wall, and contributes to the seam sealing strength and construction.

Figure 5:
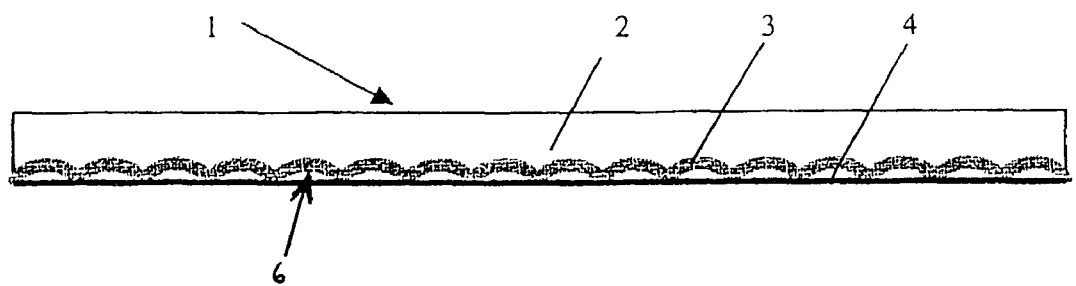
FIG. 5 is a cross-sectional view of an insulated beverage container wall according to a fifth embodiment of the present invention.

FIG. 5 is a cross sectional view of a container wall according to a fifth embodiment of the present invention. A HDPE layer 3 is extruded or laminated onto the paper stock surface 2 before embossing. The paper stock 2 and HDPE layer 3 are then embossed to create a plurality of depressions that will trap air. A film layer 4 is them laminated to the HDPE layer 3 thereby trapping air and creating a barrier for the beverage or food stored within the container. Both the HDPE layer 3 and the film layer 4 will contribute to the seam sealing operation. The film layer 4 can be constructed of a thin polymer film as aforementioned with reference to the air containing layer 4 of FIG. 1.

Figure 6:
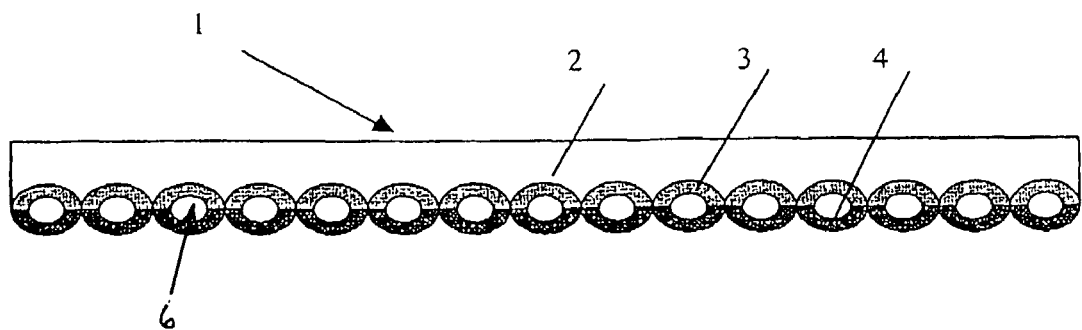
FIG. 6 is a cross-sectional view of an insulated beverage container wall according to a sixth embodiment of the present invention.

FIG. 6 is a cross sectional view of a container wall according to a sixth embodiment of the present invention. A HDPE layer 3 is extruded or laminated onto the embossed paper stock surface 2. A thin polymer film layer 4 is then laminated to the HDPE layer 3, thereby trapping air and creating a barrier for the beverage or food stored within the container. Both the HDPE layer 3 and the thin polymer film layer 4 will contribute to the seam sealing properties of the container.

Figure 7:
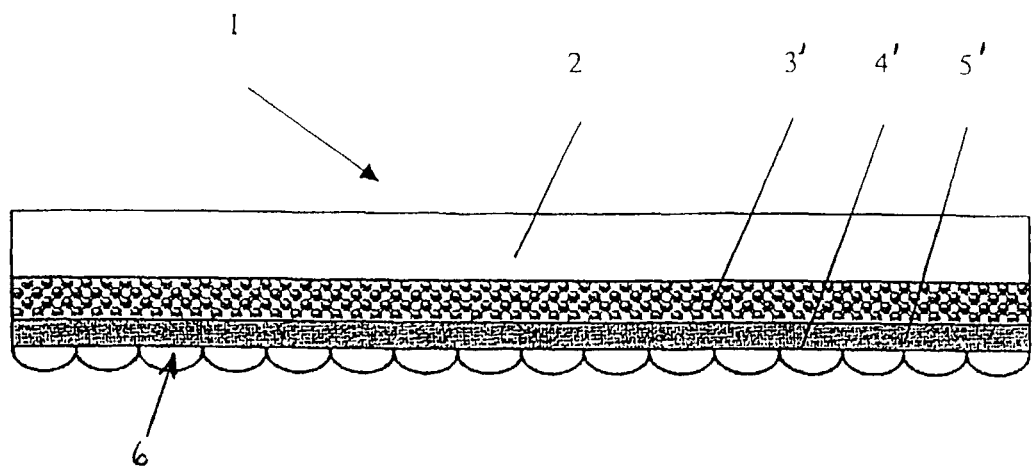
FIG. 7 is a cross-sectional view of an insulated beverage container wall according to a seventh embodiment of the present invention.
Figure 8:
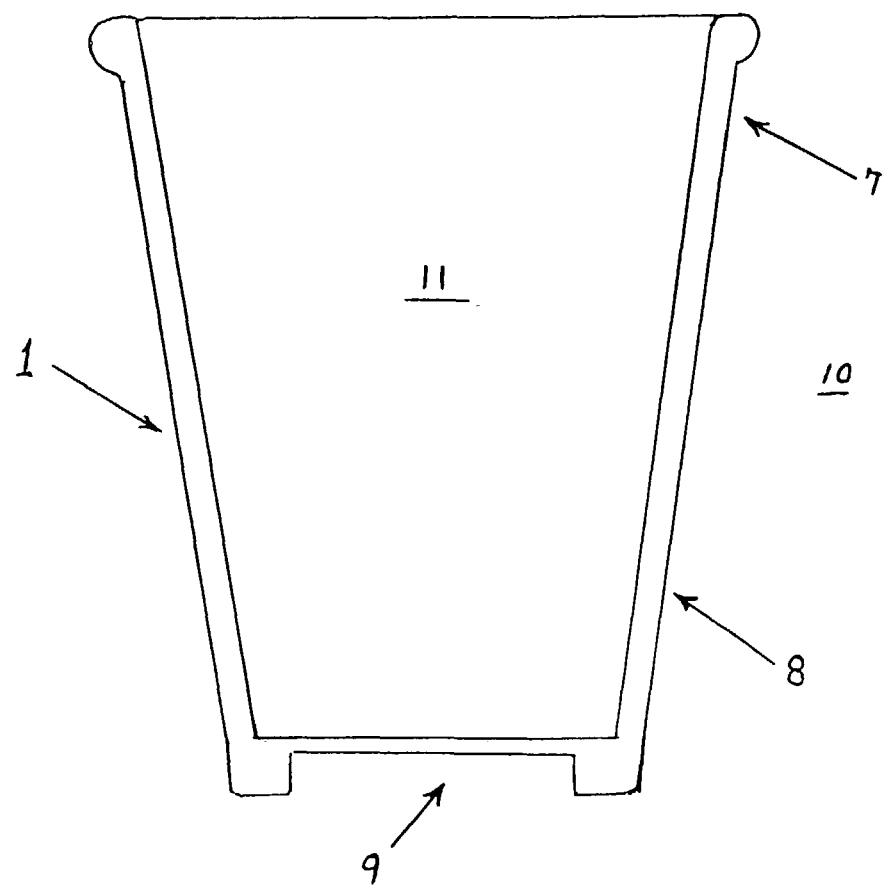
FIG. 8 is a side cross-sectional view of an insulated beverage container according to the present invention.

FIG. 7 is a cross sectional view of a container wall according to a seventh embodiment of the present invention. The paper stock 2 is coated with an insulating coating 3' to provide additional resistance to heat transfer. Optionally, a HDPE layer 4' is provided which will aid in adhering a subsequent thin polymer film layer 5' to an interior surface of the insulating coating 3'. The polymer film layer 5 serves to trap air, as a barrier to beverages and food in the container, and aids in seam sealing properties of the container.

The insulating coating 3' may be applied with a rough or perforated surface that allows only partial contact between adjacent layers. This will further limit the effective area available for heat transfer. The rough or perforated surface may be inherent in the coating design or materials or may be manufactured into the coating. This can be achieved through disruption of the coating layer during application, or by creating a dimensional pattern in the coating through mechanical means such as embossing, pressing, blowing air or vapor through or into the coating, etc.

A preferred coating material of the present invention is an expanding foam. This expanding foam material is encapsulated isobutane in a polymeric shell. The expanding foam capsules are added to the coating with a small diameter. Upon drying the foam and increasing the heat to a certain temperature, the encapsulated isobutane changes from a liquid to a gas and the polymeric shell expands with the appropriate volumetric change.

The resulting expanded spheres or cavities have a very low density and low thermal conductivity. Expanded foam also has the advantage of creating a rough surface that will further reduce the contact area between layers in the container wall and therefore reduce heat transfer.

Another preferred coating is foamed coating. Foamed coating is a coating that utilizes entrained air. The dispersed air in the coating provides a low coating density and low thermal conductivity. The foamed coating also accepts and is easily processed to achieve surface modification. The foamed coating will therefore allow a rough or perforated surface to be created through the means of an embosser, press other mechanical device.

Foam coating also has the ability to be used as a single coating, or may also act as the insulating coating 3' and a printing coating simultaneously, depending on the application and desires of the end user.

The selected coating materials for the insulating coating 3' are dispersed in an aqueous system with additional components added as necessary to provide ease of processing and application. Pigments such as silica, calcium carbonate, clay and synthetic pigments may be also used.

Binders are included to adhere the coating to the paper substrate. Typical binders may be selected from, but are not limited to, poly vinyl alcohol, SBR latex, starch, poly acrylates and other binders well known in the related art. Other additives may be included in the coating to aid in dispersion, rheology and coating handling. These additives include, but are not limited to, defoamers, dispersants, wetting agents, conductive polymers, styrene malefic anhydride, thickeners, etc.

The insulating coating is applied between 2 and 30 lbs/3300 ft$^2$, and more preferably between 5 and 15 lbs/3300 ft$^2$. A preferred thickness of the insulating coating is between 1 and 15 mils, most preferably between 3 and 10 mils.

U.S. Pat. No. 5,911,904 to Shih et al; U.S. Pat. No. 5,993,705 to Grischchenko et al.; and U.S. Pat. No. 6,085,970 to Sadlier, although directed toward distinct insulating container coatings and fabrication processes from that of the present invention, generally describe many of the manufacturing coating, heating and assembling processes that are commonly utilized in the paper cup/container stock art. The details of these coatings, heating and assembling processes are herein incorporated by reference to the present invention.

The preferred embodiments depicted in the accompanying figures are directed toward the application of an air containing film layer 4 toward or along the interior surface of a container (e.g. beverage-side of the container). However, it will be appreciated by one of ordinary skill in the art that the air containing film layer 4 can be alternatively, or in combination with the interior air containing film layer 4, applied along the exterior surface of the container.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A stock material usable to form an insulated container, comprising:
   a paper stock layer having a plurality of depressions;
   an extruded or laminated barrier layer continuously formed on the surface of said paper stock layer, including being formed on said plurality of depressions so that said extruded or laminated barrier layer includes depressions;

a thin polymer film extending over said extruded or laminated barrier layer and spot tacked to said extruded or laminated barrier layer, and an air containing layer having a plurality of air pockets contained between said thin polymer film and said extruded or laminated barrier layer.

2. The insulated container stock material according to claim 1, wherein said paper stock material has a thickness greater than or equal to 10 mils and less than or equal to 26 mils.

3. The insulated container stock material according to claim 1, wherein said laminated or extruded barrier layer is formed from high density polyethylene, low density polyethylene, linear low density polyethylene, or oriented polypropylene.

4. The insulated container stock material according to claim 1, wherein said extruded or laminated film layer contains a plurality of depressions for forming a surface of said air containing layer.

5. The insulated container stock material according to claim 1, further comprising an insulating coating sandwiched between said extruded or laminated barrier layer and said paper stock layer.

6. An insulated container comprising:
a container wall forming a side portion of said container;
a bottom portion engaging said container wall along a lower side portion;
a paper stock layer having a plurality of depressions on a surface thereof along an exterior surface of said container wall;
an extruded or laminated barrier layer continuously formed on the surface of said paper stock layer, including being formed on said plurality of depressions so that said extruded or laminated barrier layer includes depressions;
a thin polymer film extending over said extruded or laminated barrier layer and spot tacked to said extruded or laminated barrier layer;
an air containing layer having a plurality of air pockets contained between said thin polymer film and said extruded or laminated barrier layer.

7. The insulated container according to claim 6, wherein said laminated or extruded barrier layer is formed from high density polyethylene, low density polyethylene, linear low density polyethylene, or oriented polypropylene.

8. The insulated container according to claim 6, wherein said extruded or laminated barrier layer contains a plurality of depressions for forming a surface of said air containing layer.

9. The insulated container according to claim 6, further comprising an insulating coating sandwiched between said extruded or laminated barrier layer and said paper stock layer.

10. The insulated container stock material according to claim 1, wherein said container is for a beverage or food container.

11. The insulated container according to claim 6, wherein said container is a beverage or food container.

12. The insulated container stock material according to claim 1, wherein said plurality of depressions are located on a single surface of said paper stock layer.

13. The insulated container stock material according to claim 12, wherein an opposite surface of said paper stock layer is printable.

14. The insulated container according to claim 6, wherein said plurality of depressions are located on a single surface of said paper stock layer.

15. The insulated container according to claim 14, wherein an opposite surface of said paper stock layer is printable.

16. A stock material usable to form an insulated container, comprising:
a paper stock layer having a substantially flat surface, and an opposite surface having a plurality of depressions located therein;
an extruded or laminated barrier layer continuously formed on the front surface of said paper stock layer, including being formed on said plurality of depressions so that said extruded or laminated barrier layer includes depressions;
a thin polymer film extending over said extruded or laminated barrier layer and spot tacked to said extruded or laminated barrier layer; and
an air containing layer having a plurality of air pockets contained between said thin polymer film and said extruded or laminated barrier layer.

17. An insulated container comprising:
a container wall forming a side portion of said container;
a bottom portion engaging said container wall along a lower side portion;
a paper stock layer having a substantially flat surface and an opposite surface having a plurality of depressions located therein along an exterior surface of said container wall;
an extruded or laminated barrier layer continuously formed on the surface of said paper stock layer, including being formed on said plurality of depressions so that said extruded or laminated barrier layer includes depressions;
a thin polymer film extending over said extruded or laminated barrier layer and spot tacked to said extruded or laminated barrier layer; and
an air containing layer having a plurality of air pockets contained between said thin polymer film and said extruded or laminated barrier layer.

* * * * *